July 24, 1956  M. L. ABEL  2,755,675
DOUBLE WHEEL PULLEY
Filed May 4, 1953
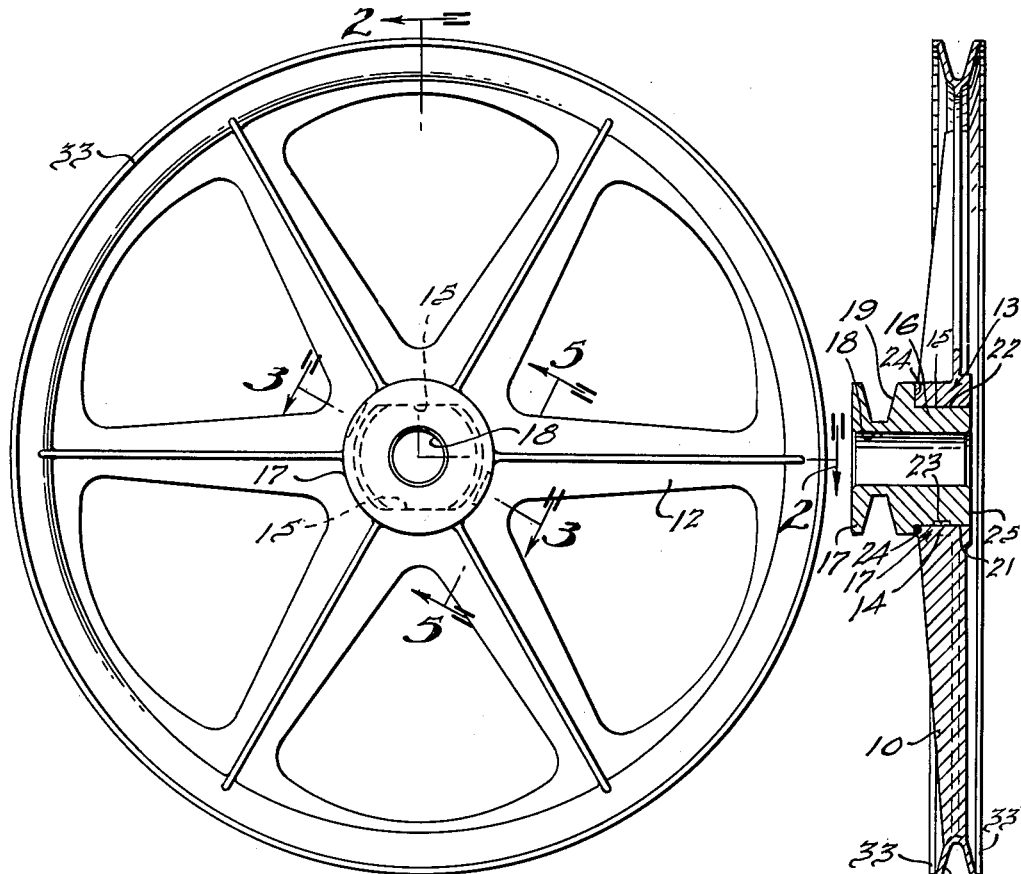
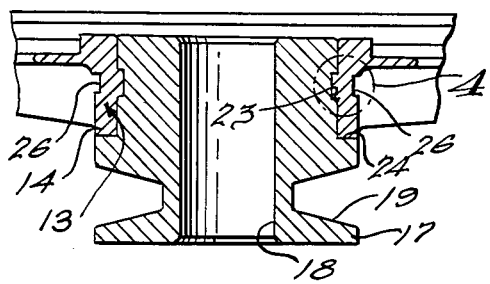
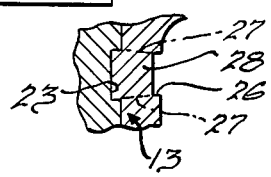
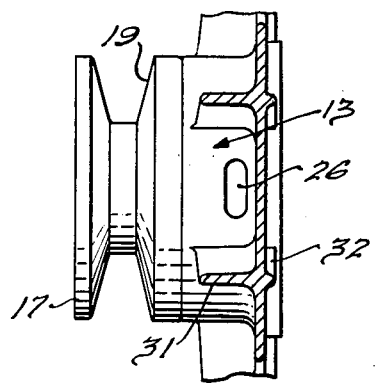
INVENTOR.
Martin L. Abel.
BY
Harness, Dickey & Pierce
ATTORNEYS.

2,755,675

DOUBLE WHEEL PULLEY

Martin L. Abel, Detroit, Mich., assignor to Tann Corporation, Detroit, Mich., a corporation of Michigan Application May 4, 1953, Serial No. 352,783

7 Claims. (Cl. 74—230.01)

This invention relates to securing means which locks two elements together, and particularly to locking means such as that employed for locking two parts of a double wheel pulley together.

The double wheel pulley is herein illustrated as a representative form of the present invention, but it is to be understood that two parts of any type may be secured together to prevent relative rotation and axial displacement when utilizing the construction of the present invention. In the double pulley illustrated, a die-cast pulley wheel part contains a central aperture which receives a hub part of a second pulley wheel. In applying the present invention thereto, the central aperture has a cylindrical portion, with two oppositely disposed flat faces which engage flat faces of the hub part of the second pulley wheel and prevent the two parts from rotating relative to each other. The cylindrical portion of the hub part of the second pulley wheel has an annular groove therein in which metal at the die-cast aperture is forced to lock the hubs against axial or endwise separation.

Accordingly, the main objects of the invention are: to provide a pair of parts which are locked together against relative rotation as well as axial displacement; to provide a rotatable element with a hub which receives the hub of an element which is to be driven therewith having flat engaging faces which prevent relative rotation and which has the metal of one hub deflected into the groove of the other hub for preventing axial separation between the hubs; to provide a felt having two pulley grooves, one disposed in a die-cast part, the other cut in a steel hub part, which parts are mechanically secured together; to mount a hub having a felt groove therein within an aperture in the hub of the die-cast pulley wheel, the hubs having at least one flat surface in engagement with each other for preventing relative rotation therebetween and a slot and dimple engagement for preventing endwise separation; to form a die-cast pulley with a central aperture for receiving a hub of a second pulley which is retained against rotation by flat mating surfaces and against axial separation by the offseting of die-cast metal into a recess in the hub of the second pulley, and, in general, to provide a double pulley made of two parts which is simple in construction and economical of manufacture.

Other objects and features of novelty of the invention will be specifically pointed out or will become apparent when referring, for a better understanding of the invention, to the following description taken in conjunction with the accompanying drawing, wherein:

Figure 1 is a view in elevation of a double wheel pulley embodying features of the present invention;

Fig. 2 is a sectional view of the structure illustrated in Fig. 1, taken on the line 2—2 thereof;

Fig. 3 is an enlarged, broken sectional view of the structure illustrated in Fig. 1, taken on the line 3—3 thereof;

Fig. 4 is an enlarged view of the structure illustrated in Fig. 3 located within the circle indicated by the numeral 4, and Fig. 5 is an enlarged, broken sectional view of the structure illustrated in Fig. 1, taken on the line 5—5 thereof.

As pointed out hereinabove, the invention herein illustrated is not to be considered limited to the pulley assembly of the drawings which is described in detail hereinafter. The concept of the invention embodies the fixing of two parts together which are to be driven in rotation so as to prevent relative rotative movement and axial displacement therebetween. A simple embodiment of the invention is illustrated in the pulley assembly of the drawing, it being understood however that the shape of the hub aperture and hub received thereby may vary and be of any form so long as the assembly is such as to prevent relative rotation between the pulley parts. Separation thereafter axially is prevented by metal deflection from one part into a groove in the other part.

Referring to the drawings, a pulley wheel 10 is illustrated, preferably made of die-cast material, having a V-groove 11 forming the peripheral rim which is supported by a plurality of spokes 12 from a hub portion 13. The hub portion is formed by a flange 14 of cylindrical shape except for the flat portions 15, which are herein illustrated as being diametrically disposed. It is to be understood that the flange could have splines or one flat portion or be of any internal polygonal shape so as to form a non-rotative relationship with a matching hub portion 16 of a pulley wheel 17. The pulley wheel 17 has a central aperture 18 which receives the shaft with which the pulley operates. The hub portion has a belt groove 19 disposed parallel to the groove 11 of the wheel 10 but spaced outwardly therefrom. The arcuate portions 21 of the hub portion 16, interrupted by the flat portions 22, has arcuate grooves 23 therein medially disposed relative to a shoulder 24 and face 25. Dimples 26 are formed in the flange by a pressure tool which deflected the metal of the flange into the groove 23 and thereby locked the hub portion and flange portion against axial movement relative to each other.

As will be noted in Fig. 4, the dimpling tool is of less width than the width of the slot 23 so that breakdown of the metal will occur along the dotted lines 27, so that in case the metal is actually sheared along the dotted lines, the resulting sheared block of metal 28 will act as a key and remain in the position illustrated in Fig. 4. The spoke portions 12 of the wheel 10 may be reinforced by ribs 31 and 32 on opposite sides thereof to provide strength thereto while permitting the spokes of minimum thickness of metal to be employed. Similarly, the V-groove 11 on the periphery of the wheel may have the ends provided with an outwardly directed flange 33, to provide strength while reducing the metal thickness.

After the pulley wheel 17 has been machined and the pulley wheel 10 cast in the form illustrated, the hub portion 16 of the wheel 17 is press-fitted within the aperture in the hub portions 13 of the wheel 10, with the flat sides 15 in engagement with each other, which thereby locks the two hub portions against relative rotation. After this assembly, a pressure tool then dimples the flange 14 to force the metal of the flange at diametrically opposite portions thereof into the arcuate slots 23 in the arcuate portion of the hub 16 of pulley 17, which thereby retains the two hub portions 13 and 16 against axial separation. In such an arrangement, the two pulleys are secured together in fixed relation against relative rotation and axial separation and provide a double wheel pulley similar to those of conventional form.

What is claimed is:

1. A double wheel pulley comprising a first pulley wheel having a grooved peripheral edge and a central hub, said central hub having an aperture defined by a cylindrical flange and an inward projection, and a second pulley wheel having a belt groove on one end and a hub portion on the other end, said hub portion being the shape of the aperture in the hub portion of said first pulley wheel which prevents relative rotation between the pulley wheels when the hub portions are in engagement with each other, said last hub portion having an arcuate groove, a portion of the flange of the first pulley wheel being deflected into the arcuate groove in the hub of the second pulley wheel to prevent axial separation between the two pulley wheels.

2. In a construction embodying a first and second member secured together against relative rotation and axial separation, a central hub on the first member containing an aperture of predetermined shape, a hub portion on the second member of the shape of the aperture in the hub of the first member into which it extends, said shape of the aperture and hub portion being such as to lock the two members against relative rotation, the hub portion of the second member having a recess, and a dimple in the hub of the first member extending into the recess in the hub portion of the second member to prevent axial separation between the members.

3. In a construction embodying a first and second member secured together against relative rotation and axial separation, a central hub on the first member containing an aperture of predetermined shape, a hub portion on the second member of the shape of the aperture in the hub of the first member into which it extends, said shape of the aperture and hub portion being such as to lock the two members against relative rotation, the hub portion of the second member having a recess, and a dimple in the hub of the first member extending into the recess in the hub portion of the second member to prevent axial separation between the members, said dimple being formed by deflecting the metal in the hub of the first member, the shear lines at the sides of the deflected metal being in converging relation so that the deflected metal will be in the form of a tapered wedge.

4. In a double-wheel pulley construction, a first pulley wheel having a central hub containing an aperture of cylindrical shape for a portion of the aperture circumference and having a portion extending into the aperture forming a flat surface, said hub supporting a peripheral rim containing a groove substantially in the plane thereof, a second pulley wheel having a pulley groove at one end and a hub portion at the other end, said hub portion being of cylindrical form except for one portion, providing a flat surface which mates with the flat surface in the aperture of the hub of the first pulley wheel when the two hub portions are press-fitted together, the hub portion of the second pulley wheel containing recesses, and dimples provided in the hub portion of the first pulley wheel the metal of which extends into the recesses in the hub portion of the second pulley wheel to prevent axial separation therebetween, said metal forced from the hub of the first pulley wheel into the recess of the hub of the second pulley wheel having the break lines converging so that the deflected metal will be in the form of a tapered wedge.

5. In a double wheel pulley, a first wheel having a hub containing an aperture, a second wheel having a hub matable within the aperture of the hub of the first wheel, the hub of said second wheel having a recess, interengaging portions on the mating surfaces of said hubs preventing the relative rotation between the hubs, and metal deflected from the hub of the first wheel forming a key engaged with the recess in the hub of the second wheel which prevents the axial separation of the hubs.

6. In a double wheel pulley, a first wheel having a hub containing an aperture, a second wheel having a hub matable within the aperture of the hub of the first wheel, interengaging portions on said hubs preventing the relative rotation thereof, the hub of said second wheel having a recess therein, and a dimple on the hub of the first wheel projecting into the recess in the hub of the second said wheel for preventing axial separation between the two hubs.

7. In a construction embodying a first and second member secured together against relative rotation and axial reciprocation, said first member having an aperture partially cylindrical and partially flat, a projection on the second member of a dimension to extend within the aperture of said first member and having a like surface partially cylindrical and partially flat, the engagement of the flat surfaces preventing relative rotation between the members, the projection of the second member having a recess, and a dimple in the first member extending into the recess in the projection of the second member which prevents axial separation therebetween.

References Cited in the file of this patent

UNITED STATES PATENTS

| 35,622 | Platt | June 17, 1862 |
| 848,183 | Luke | Mar. 26, 1907 |
| 2,209,181 | Wendel | July 23, 1940 |
| 2,257,684 | Hecht | Sept. 30, 1941 |
| 2,464,077 | Dicks | Mar. 8, 1949 |

FOREIGN PATENTS

| 24,013 | Great Britain | 1896 |
| 278,221 | Great Britain | Oct. 6, 1927 |